United States Patent [19]
Tomsa et al.
[11] 3,735,048
[45] May 22, 1973

[54] IN-BAND DATA TRANSMISSION SYSTEM

[75] Inventors: Stanley J. Tomsa, Chicago; Bruce C. Eastmond, Westmont, both of Ill.
[73] Assignee: Motorola, Inc., Franklin Park, Ill.

[22] Filed: May 28, 1971
[21] Appl. No.: 148,040

[52] U.S. Cl. ...............179/15 BM, 179/2 DP, 325/26
[51] Int. Cl. ....................................H04m 11/06
[58] Field of Search ......................179/2 DP, 15 BM; 325/26

[56] References Cited

UNITED STATES PATENTS 3,004,104 10/1961 Hembrooke ..........................325/26
3,529,088 9/1970 Hauer ..............................179/15 BM

*Primary Examiner*—Ralph D. Blakeslee
*Attorney*—Vincent Rauner and M. Dickler

[57] ABSTRACT

An information transmission system for transmitting data signals simultaneously with audio signals in an audio channel includes a gate circuit at the transmitting unit for interrupting the transmitted audio at a rate controlled by the data signal, and a detector at the receiving unit for detecting the interruptions in the audio and reconstructing the data signal from the interruptions. The duration of the interruptions is selected to be short enough so as not to be readily detectable audibly. The system is suitable for use in a multiple radio-receiver system wherein signals are transmitted from spaced receivers to a central station with data signals indicating the quality of the signals received at each receiver.

11 Claims, 5 Drawing Figures

INVENTORS:
STANLEY J. TOMSA
BRUCE C. EASTMOND

INVENTORS:
STANLEY J. TOMSA
BRUCE C. EASTMOND

INVENTORS:
STANLEY J. TOMSA
BRUCE C. EASTMOND

IN-BAND DATA TRANSMISSION SYSTEM

BACKGROUND

This invention relates generally to data transfer systems, and more particularly to simultaneous audio and data transfer systems for use with voice grade transmission channels.

There are many applications wherein it is desired to transmit data signals along with voice signals on a single channel. One such system commonly used is to provide data signals for selecting one of several received audio signals in systems known as "voting" systems. Receiver voting systems are mulitple receiver communications systems including a multiplicity of receiver sites and a central office. Radio frequency receivers at the receiver sites receive radio frequency signals from mobile or portable transmitters. The audio signals from these receivers are transferred, usually via telephone lines, to the central office. In addition a signal indicative of the signal strength of the radio frequency signal being received by each receiver must also be transferred to the central office. This signal enables the central office to select the receiver that is receiving the strongest radio frequency signal and to couple its audio output to a loudspeaker or other reproducing device.

Several techniques for providing simultaneous transmission of audio and data over restricted bandwidth voice grade channels are known. These systems generally restrict the bandwidth of the audio to less than the total bandwidth of the channel and transmit the data in the remaining bandwidth. Other systems use time division multiplex, transmitting the data alternately in time between audio transmissions.

Whereas these techniques provide a way to transmit audio and data simultaneously, the first technique requires expensive filters and further limits the audio bandwidth over the limits imposed by the transmission channel. The time division multiplex technique requires synchronization circuitry between the transmitter and receiver, adding further complexity to the system.

SUMMARY

It is an object of the present invention to provide an improved data transfer system for simultaneously transferring audio signals and data signals over a standard audio channel.

It is a further object of this invention to provide a voice and data transfer system that does not require band separation filters.

It is another object of this invention to provide a transfer system for the transfer of audio and data signals that does not require synchronization circuitry.

A still further object of the invention is to transfer data signals with an audio signal by interrupting the audio signal in a way that does not degrade the audio intelligence.

Still another object of the invention is to provide an improved receiver voting system wherein signals representing the quality of received signals are transmitted along with audio signals from each of a plurality of receivers.

In accordance with a preferred embodiment of the invention, a transmitting unit is employed wherein an audio signal is interrupted at a variable rate, the rate being dependent upon the data to be transmitted. The time duration of the interruption is fixed and is short enough that the interruptions are not readily detectable audibly. The interrupted audio is applied to a telephone line or other voice grade transmission medium for transfer to a receiving unit.

At the receiving unit, the interrupted audio is applied directly to an audio reproduction system for reproduction of the audio signal. The interruptions in the audio do not affect the audio reproduction system, nor do they affect the quality of the audio as reproduced. The same interrupted audio signal is also amplified, limited and detected to recover the interruptions. Amplifiers and limiters remove the envelope variations from the audio signal making it possible to detect the interruptions with a simple diode detector. The detected interruptions are applied to a converter which detects the interruption rate and provides an output signal under the control of the detector. The converter output signal is substantially similar to the data signal applied to the transmitting unit.

The data transfer system is applicable to multi-receiver communications systems commonly known as "voting" systems, wherein radio receivers at a multiplicity of receiver sites are coupled via telephone to a central office site. The radio receivers receive radio frequency signals from transmitters which may be either mobile or portable, and provide audio signals in response to the radio signals. The central office selects the audio signal from the receiver that is receiving the strongest radio frequency signal for reproduction by the audio circuitry at the central office site. In order to accomplish the receiver selection, signal strength information indicative of the strength of the signal received by each receiver is transmitted to the central office. The signal strength information signals are transferred to the central office by interrupting the audio signal in the manner described.

DETAILED DESCRIPTION

Figure 1:
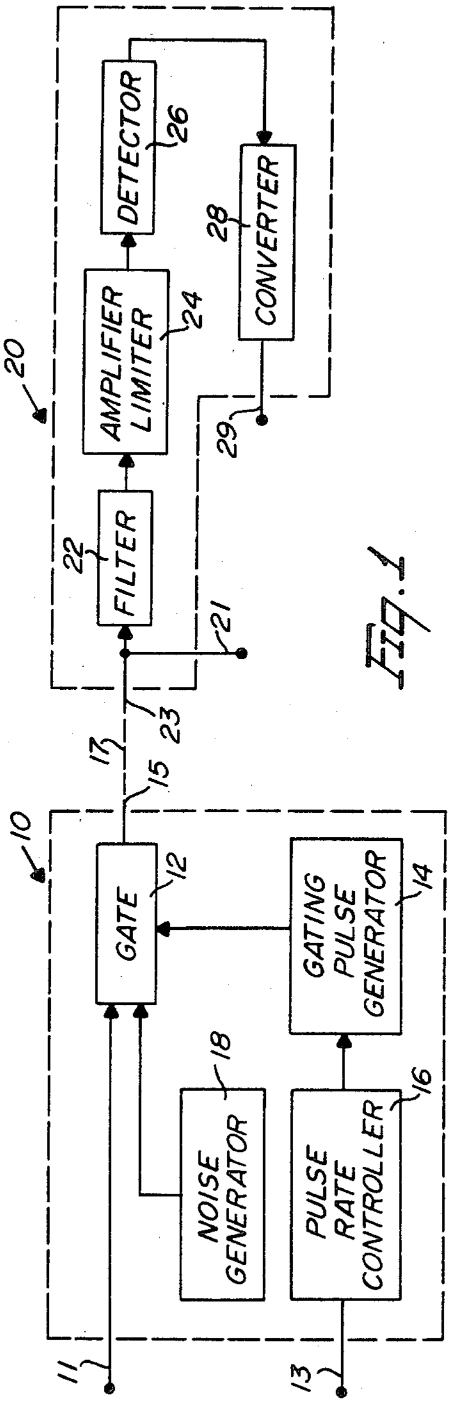
FIG. 1 is a block diagram of the simultaneous audio and data transfer system according to the invention.

Referring now to the drawings in greater detail, FIG. 1 shows in block diagram form a transmitting unit 10 and a receiving unit 20 of the simultaneous audio and data transfer system. Transmitting unit 10 has two inputs 11 and 13 and a single output 15. Input 11 is an audio input point to which audio frequency signals may be applied. Input 13 is a data input point to which low rate data signals may be applied. Output 15 provides a composite audio and data signal which may be transmitted by a voice grade channel, such as telephone line 17.

In operation, the audio signal from input 11 is applied to a gate 12 which interrupts the audio at a rate dependent upon the data signal applied at input 13. These interruptions are typically of a 5 millisecond duration and may occur every 200 to 500 milliseconds without substantially degrading the audio quality. The output of gate 12 is coupled to output 15 of the transmitting unit 10. A noise generator 18 provides an audio frequency noise signal at a level approximately 35 decibels below the average level of the audio signal applied to gate 12. The noise generator output signal is applied to gate 12 along with the audio signal from input 11. Thus, if there is no audio present, there will, in any case, be a signal available; in this case the noise signal, for the gate to interrupt. In addition, the addition of noise prevents pauses between words and syllables from being interpreted as interruptions by the system.

A low rate data signal is applied to point 13. A pulse rate controller 16 receives the data signal, which may be either a digital or analog signal, and converts it to a variable rate clock signal. The clock signal is a digital signal whose repetition rate is proportional to the amplitude or to some other characteristic of the input data signal applied to input 13. The clock pulses are applied to and used to control a gating pulse generator 14. Gating pulse generator 14, which generates narrow gating pulses in response to clock pulses from pulse rate controller 16, is connected to gate 12 and provides gating pulses thereto to interrupt the audio signal flowing through the gate. The interrupted audio signal is applied from output 15 to transmission medium 17 for transmission to a receiving unit 20.

The receiving unit 20 of the simultaneous data and audio transfer system has an input point 23 for receiving the data modified audio signals from the transmission medium 17 and has an interrupted audio output point 21 and a data output point 29. The signal from input 23 is applied directly to output point 21. Audio reproduction circuitry may be coupled to output point 21 for the receipt and reproduction of the interrupted audio signal. A filter similar to filter 22 may be interposed between output point 21 and the audio reproduction circuitry, or output point 21 may be coupled to the output of filter 22 instead of to transmission medium 17 if desired for transmission medium noise reduction or other purposes. The interruptions in the audio signal are not readily audible and the reproduced signal sounds like unmodified audio. The output signal from filter 22 is applied to amplifier-limiter 24 which provides a constant amplitude output signal whenever audio is present. Hence, the output from the amplifier-limiter is of a constant amplitude when audio is being passed by gate 12 of transmission units 10. When gate 20 is opened to interrupt the audio, amplifier-limiter 24 of the receiving unit 20 is no longer limiting the audio signal and the amplitude of the output signal therefrom drops below the amplitude determined by the limiting level of amplifier-limiter 24. The limiter output signal is applied to detector 26 which detects the amplitude of that signal. Detector 26 provides an output pulse each time a drop in the amplitude of the amplifier-limiter output is detected. Converter 28 is coupled to receive the output pulses from detector 26 and converts the output pulses to a signal that is substantially similar to the data input signal at input 13 of transmitting unit 10.

Figure 2:
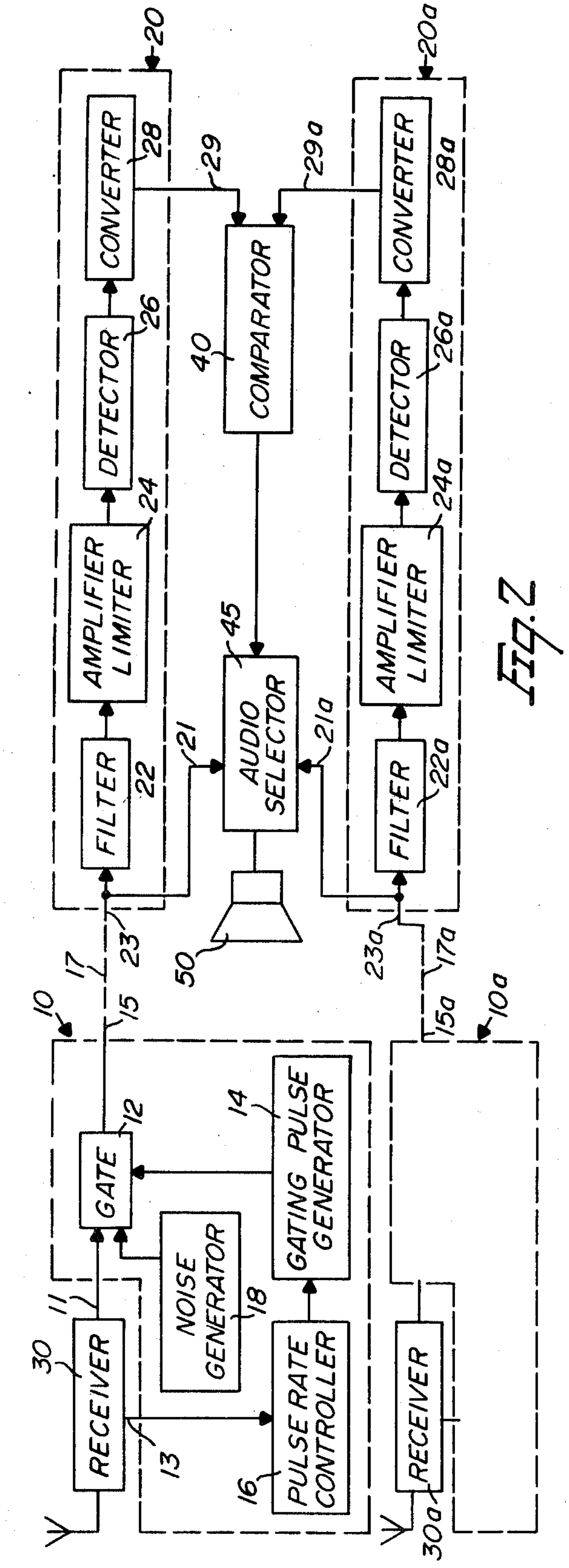
FIG. 2 is a block diagram of the simultaneous audio and data transfer system used in conjunction with a multi-receiver communications system employing receiver voting.

FIG. 2 shows the simultaneous audio and data transfer system including transmitting unit 10 and receiving unit 20 used in a receiver voting system. Similar numbers are used to denote similar functions in FIGS. 1 and 2.

Receiver voting systems are commonly used in urban areas and include several satellite receiver sites and a central office. The receiver sites receive radio frequency signals from transmitters which may be mobile or portable (not shown). The audio outputs of the receivers at the sites are coupled via telephone lines to the central office. At the central office, the audio signal from the receiver that is receiving the strongest radio frequency signal is selected for reproduction by audio circuitry at the central receiver site. In order for the central office to accomplish the selection, each satellite receiver must transmit a signal indicative of received radio frequency signal strength to the central office. The selector at the central office selects the appropriate receiver based on this signal. The simultaneous audio and data transfer system of FIG. 1 transfers the signal strength signal to the central office.

Receiver 30 is a radio receiver suitable for receiving radio frequency signals from the previously mentioned mobile and portable transmitters. Receiver 30 is coupled to input 11 and input 13 of transmitting unit 10. An audio signal is fed to input 11 and a data signal indicative of the received radio frequency signal strength is fed to input 13. The signal strength information signal fed to input 13 may be derived from the IF section, or from the squelch, or from any other convenient point in the receiver. The pulse rate controller 16 receives the signal strength information signal, which is an analog signal, and converts it to a variable rate clock signal. In this embodiment, the time between clock pulses increases as the received audio frequency signal strength increases. Hence, in voting systems, the data modified audio output signal at point 15 is similar to a receiver audio output signal that is interrupted at a rate dependent upon received signal strength, the time between interruptions being proportional to the strength of the radio frequency signal being received by receiver 30. Any number of satellite receiver sites which include a communications receiver and a transmitting unit may be used.

At the central office, a receiving unit, similar to receiving unit 20 of FIG. 1, is used in conjunction with each receiver site. Hence, the number of receiving units is equal to the number of transmitting units at the receiver sites. For simplicity, only two transmitting units 10 and 10*a* and two receiving units 20 and 20*a* are shown in FIG. 2. Additional circuitry required in a voting system includes a comparator coupled to each of the receiving units receiving data signals therefrom and comparing the amplitudes of these data signals. An audio selector, which is coupled to each of the receiving units and receiving interrupted audio signals therefrom selectively passes one of the audio signals to a speaker 50 or other reproducing system, which is also connected to the audio selector. The selection of the audio signal to be passed is determined by the output signal of comparator 40 which is fed to audio selector 45.

In operation, the data modified audio signal from line 17 is fed to input 23 of the receiving unit 20. The input signal is applied to the series combination of filter 22, amplifier limiter 24 and detector 26 which may be of conventional design. The output signal from detector 26 which is a variable rate digital signal is applied to converter 28 which provides an analog output signal which varies with the analog signal strength information signal from receiver 30. The amplitude of the analog output signal at point 29 of receiving unit 20 is proportional to the amplitude of the radio frequency signal received by receiver 30. A similar receiving unit is provided for each receiver site and associated transmitting unit.

The data output signals from receiving units 20 and 20*a* are applied to and the amplitudes thereof are compared at comparator 40. The output from comparator 40 controls an audio selector 45 which is also coupled to points 21 and 21*a* of receiving units 20 and 20*a* to receive data interrupted audio signals from the corresponding transmitting units 10 and 10*a*. The comparator output signal causes the audio selector to pass the data interrupted audio signal from the transmitting unit providing the highest signal amplitude at the data output point 29 or 29*a* of its associated receiving unit. The passed audio signal is reproduced by loudspeaker 50 connected to audio selector 45. The system thus provides automatic selection of the particular transmitting unit whose associated radio receiver is receiving the strongest radio frequency signal.

Figure 3:
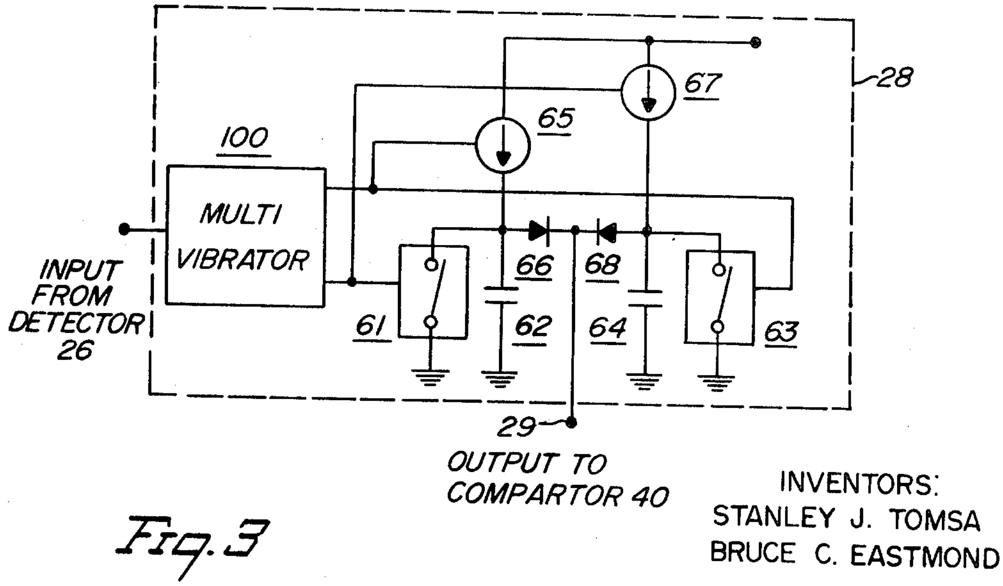
FIG. 3 is a schematic diagram of the converter of FIGS. 1 and 2.

Referring to FIG. 3, this shows the converter 28 in schematic form to illustrate the operation thereof. Interruption pulses from detector 26 are applied to multivibrator 100. When multivibrator 100 receives the first interruption pulse from detector 26, multivibrator 100 changes state to provide a pulse which causes switch 61 to short capacitor 62 to ground momentarily to initialize the charge on capacitor 62. Multivibrator 100 also turns on current source 65 which charges capacitor 62. Current source 65 remains on and the voltage across capacitor 62 continues to increase until a second pulse is received by multivibrator 100. This causes multivibrator 100 to change states again, to turn off current source 65, monentarily close switch 63, and turn on current source 67 to charge capacitor 64. The voltage to which capacitor 62 is charged is a direct function of the elapsed time between interruption pulses. The voltage across capacitor 62 remains at the value it reached just before current source 65 was turned off. The diode matrix comprising diodes 66 and 68 connects capacitor 62 to point 29 when the voltage across capacitor 62 is greater than that across capacitor 64, thereby allowing the voltage across capacitor 62 to be monitored. Capacitor 62 will be monitored until another pulse which reinitializes capacitor 62 and allows capacitor 64 to be monitored is received, or until a sufficient time has elapsed to allow capacitor 64 to charge to a voltage which exceeds the voltage across capacitor 62. In this case, the diode matrix will switch point 29 to capacitor 64 before the succeeding pulse is received, allowing the output voltage to rise in accordance with the voltage on capacitor 64.

Figure 4:
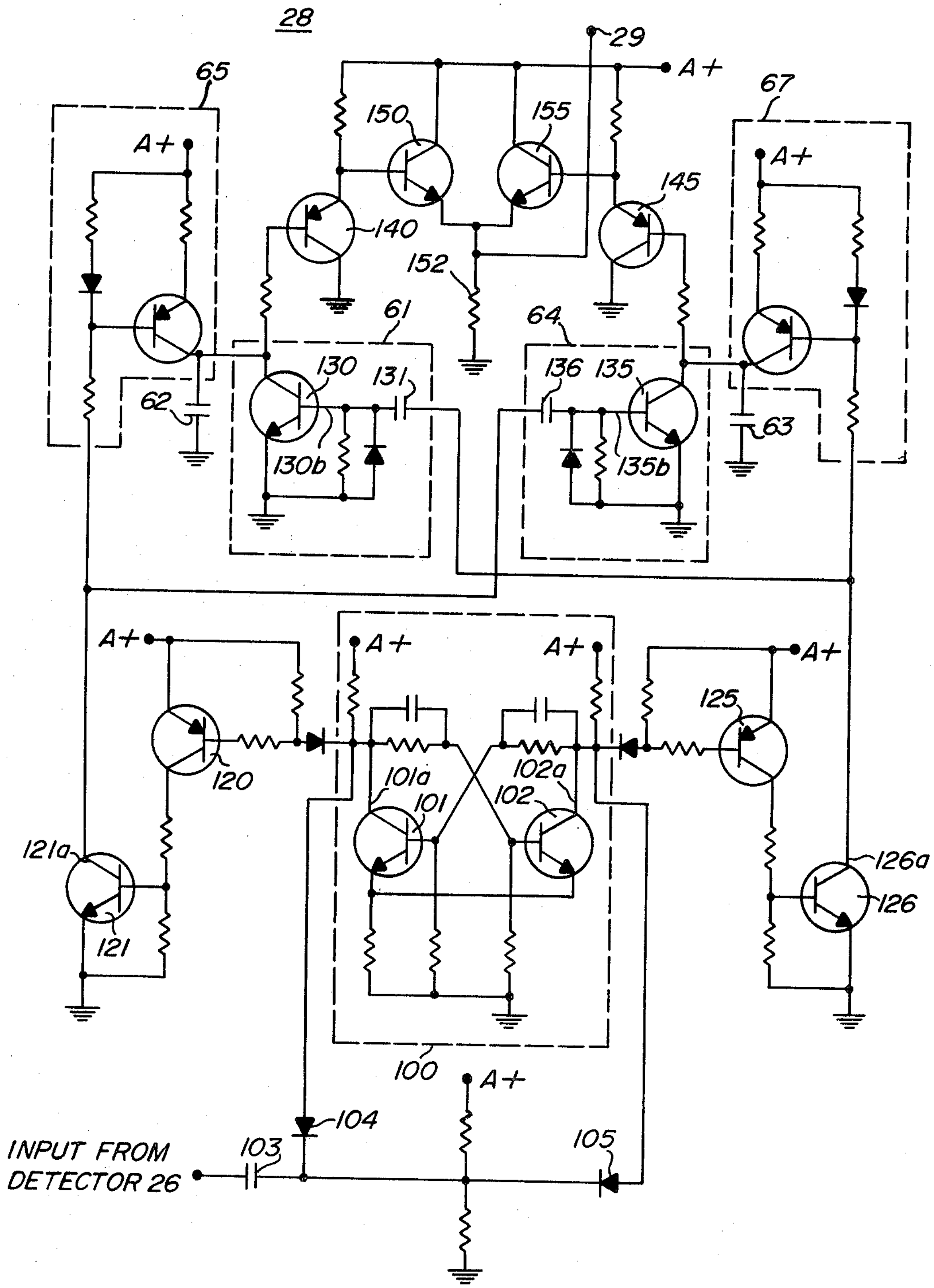
FIG. 4 is a detailed circuit diagram of the converter shown in simplified form in FIG. 3.

Refer now to FIg. 4, which provides a more detailed description of the operation of converter 28. Similar numbers are used to refer to similar components in FIGS. 3 and 4. Transistors 101 and 102 with associated elements form a collector coupled bistable multivibrator 100. Voltage pulses, corresponding to detected interruptions, are passed through capacitor 103 to trigger diodes 104 and 105. These diodes and their associated biasing circuitry are arranged so that the collector 101*a* of transistor 101 and collector 102*a* of transistor 102 will interchange voltage levels each time a pulse corresponding to a detected interruption is applied to capacitor 103. Transistors 120 and 125 are level shifters directly driving transistor switches 121 and 126 which control current sources 65 and 67. Thus, as the multivibrator is toggled, current sources 65 and 67 are alternately switched on and off. The voltages at collectors 121*a* and 126*a* of transistors 121 and 126 are differentiated by capacitors 136 and 131 and applied to bases 135*b* and 130*b* of transistors 135 and 130. Transistors 130 and 135 and their associated circuitry comprise switches 61 and 64. Transistors 130 and 135 are normally in a nonconductive state, but are alternately rendered conductive for a brief time by rising voltages at collectors 126*a* and 121*a* of transistors 126 and 121. When transistors 130 and 135 are rendered conductive, they discharge capacitors 62 and 63 to initialize the charging circuitry. Following initialization, each capacitor is charged by its associated current source for as long as the current source is on. The voltages on capacitors 62 and 63 are sensed by emitter followers 140 and 145 which serve to isolate the capacitors from the following comparator stage. The comparator stage comprises transistors 150 and 155 which are connected to provide an output voltage across resistor 152. The voltage across resistor 152, which appears at point 29, corresponds substantially to the larger of the voltages across capacitors 62 and 63.

In order to understand the operation of the rate to DC converter, let us assume that transistor 101 of the bistable multivabrator 100 is non-conducting and the transistor 102 is in its conductive state. Since transistor 101 is non-conducting, the voltage on collector 101*a* of transistor 101 is near supply potential. This causes transistor 120 to be nonconductive, which in turn makes transistor 121 also nonconductive, thereby causing current source 65 to be in its off state. When a negative pulse is received at capacitor 103 from detector 26 of FIGS. 1 and 2, diode 104 is forward biased to allow the pulse to pass to collector 101a of transistor 101. This causes multivibrator 100 to change state making transistor 101 conductive which in turn makes transistors 120 and 121 conductive. Transistor 121 then completes the bias path of current source 65 causing that current source to turn on and to charge capacitor 62. Capacitor 62 continues to charge until the next pulse is received from detector 26. This causes multivibrator 100 to change states again making transistors 101, 120 and 121 non-conductive. When transistor 121 becomes non-conductive, the voltage at its collector rises turning off current source 65, thereby terminating the charging of capacitor 62. The voltage across capacitor 62 remains at the voltage reached just before current source 65 was turned off. In addition, the rising collector voltage is applied to capacitor 136 which differentiates that voltage and causes transistor 135 to conduct momentarily to discharge capacitor 63. Transistors 102, 125 and 126 are now conductive causing current source 67 to be on, thereby charging capacitor 63. As long as the voltage across capacitor 62 is greater than the voltage across capacitor 63 the output network consisting of transistors 140, 150, 145 and 155 will provide an output at point 29 substantially equal to the voltage across capacitor 62. The voltage across capacitor 63 can exceed the voltage across capacitor 62 if the duration between input pulses from detector 26 is long enough to allow capacitor 63 to accumulate enough charge so that its voltage exceeds that of capacitor 62. Under these conditions the voltage at point 29 will be substantially equal to the voltage across capacitor 63. If the time duration between input pulses is so short that the voltage across capacitor 63 does not exceed the voltage across capacitor 62 the output voltage will be substantially that across capacitor 62 until the following pulse is received. When this happens, multivibrator 100 will again change states causing switch 65 to discharge capacitor 62 thereby causing the voltage at point 29 to be substantially similar to the voltage across capacitor 63. Current source 65 will then commence charging capacitor 62 and the process will be repeated.

Figure 5:
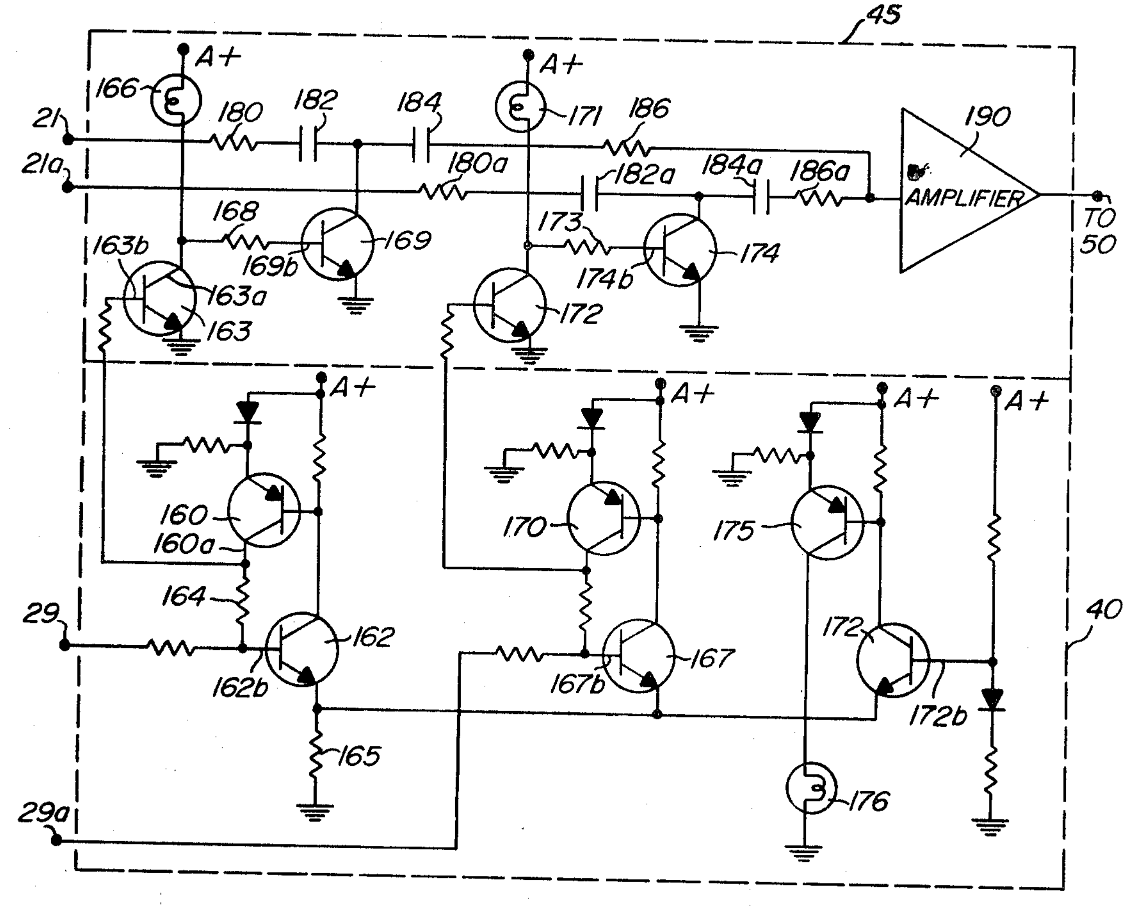
FIG. 5 is a circuit diagram of the comparator 40 and selector 45 of FIGS. 1 and 2.

Comparator 40 of FIG. 2 can be a simple multiple input differential amplifier. However, due to the requirements of receiver voting systems, it is desirable to have hysteresis in the comparator. This eliminates ambiguities when more than one input has the same DC level. FIG. 5 is a circuit diagram of hysteresis type comparator 40 and audio selector 45. Hysteresis for the comparator is provided by transistors 160 and 170. When no radio signal is being received by any radio receiver at any of the receiver sites, the voltages from converters 28 and **28*a* applied to points 29 and 29*a* are less than the reference voltage at the base 172*b* of transistor 172. This causes transistor 172 to conduct which in turn causes transistor 175 to conduct. When transistor 172 conducts, the voltage across resistor 165 is approximately equal to the voltage at base 172*b*. The conduction of transistor 175 provides current which may be used to drive a no-signal indicator such as light bulb 176. When a radio signal is being received by the radio receiver at the site corresponding to point 29 and the voltage at point 29 is higher than the reference voltage at base 172*b*, transistor 162 conducts which in turn causes transistor 160 to conduct. Collector 160*a* of transistor 160 is coupled to base 162*b* of transistor 162 through resistor 164. Conduction of transistor 160 allows current to flow through resistor 164 to cause the voltage at base 162*b* to be higher than the voltage at point 29. The voltage across resistor 165 is now determined by the voltage at the base 162*a* of transistor 162, and is higher than the voltage at point 29. In the event that the voltage at point 29*a* is equal to the voltage at point 29, transistor 167 will remain nonconductive and the receiver site associated with point 29 will remain selected. The voltage at point 29*a* must be greater than the voltage across resistor 165 to cause transistor 167 to conduct and cause the receiver site associated with point 29** to be selected.

Collector **160*a* of transistor 160 is also connected to base 163*b* of transistor 163 through coupling resistor 161. When transistor 160 conducts, indicating that the receiver associated with point 20 is receiving the strongest radio signal, current flows through resistor 161 to turn on transistor 163. Conduction of transistor 163 causes light bulb 166 to glow, indicating that the receiver corresponding to point 29 has been selected. Conduction of transistor 163 causes the voltage at collector 163*a* to be near ground potential, thereby cutting off shunt transistor 169 to allow the composite audio signal to pass from point 21 through resistor 180, capacitor 182, capacitor 184 and resistor 186 to amplifier 190 for amplification thereof to a sufficient level to drive transducer 50 of FIG. 2. When the site associated with point 29 is receiving the strongest radio signal, the voltage at base 162*b* is greater than the voltage at base 167*b*, thereby rendering transistor 167 nonconductive. This renders transistors 170 and 172 nonconductive. When transistor 172 is nonconductive, current flows from the power supply through light bulb 171 and resistor 173 to base 174*b* of transistor 174. The magnitude of the current is insufficient to cause light bulb 171 to glow, but is sufficient to turn on shunt transistor 174. When transistor 174 is conductive, the audio signal associated with the receiver corresponding to point 29 appearing at point 21*a* is coupled through resistor 180*a*, capacitor 182*a* and shunt transistor 174 to ground, thereby preventing it from entering amplifier 190. In this way, the audio signal associated with the receiver site receiving the strongest radio signal is selected by selector 45 for transmission of transducer 50 of FIG. 2**.

In summary, the system provides a reliable, low cost and efficient means for transmitting data signals and audio signals simultaneously on a limited bandwidth transmission channel. The system eliminates the need for expensive band pass and band reject filters used in other simultaneous transmission systems. In addition, the complex synchronization circuitry required by other transfer systems such as, for example, time division multiplex systems presently in use is eliminated in the present system. While the system according to the invention has been shown and described in conjunction with a receiver voting system, it is understood that it can be used where it is necessary to transmit low rate data simultaneously with voice information on a single channel.

We claim:

1. In an information transfer system for transferring audio and data signals simultaneously within a common frequency band, with substantially no interference between the signals, a transmitting unit including in combination, audio means for providing audio signals, noise signal means for providing noise signals, summing means coupled to said audio means and said noise signal means for receiving said audio signals and said noise signals and providing sum signals of said audio signals and said noise signals, an electronic audio gate circuit coupled to said summing means and receiving the sum signals therefrom, data signal means providing variable rate data signals, said data signal means being coupled to said audio gate circuit and cooperating therewith to cause said audio gate circuit to interrupt the sum signals at said data signal rate for intervals having a fixed time duration thereby providing data modified audio signals.

2. An information transfer system as recited in claim 1 wherein said data signal means includes interruption pulse generating means responsive to said data signals and providing interruption signals of a fixed duration at a rate varying in accordance with a predetermined characteristic of said data signals, said interruption pulse generating means being coupled to said gate circuit and applying said interruption signals thereto, said audio gate circuit being responsive to said interruption signals for interrupting the audio signals for a duration and rate determined by said interruption signals to provide said data modified audio signal.

3. An information transfer system as recited in claim 1 wherein said data signal rate is less than five interruptions per second and said time duration is less than 20 milliseconds.

4. An information transfer system as recited in claim 1 further including receiving means comprising, means for receiving said data modified audio signals, audio translating means coupled to said signal receiving means for receiving said data modified audio signals for translation thereof, interruption detection means coupled to said signal receiving means for receiving said data modified signals for detecting the rate of interruption thereof, said interruption detection means providing output signals having a characteristic varying with said interruption rate.

5. An information transfer system as recited in claim 4 wherein said interruption detection means includes, audio amplifying means coupled to receive said data modified audio signal for amplification thereof, limiting means coupled to said amplifying means receiving signals therefrom and providing a limited output signal of substantially constant amplitude, and amplitude detection means coupled to said limiting means receiving amplitude limited signals therefrom and providing output signals, said output signals having characteristics varying with the transmitted data signals.

6. An information transfer system as recited in claim 1 including receiving means comprising, means for receiving said data modified audio signal, audio reproducing means including audio amplifier means and loudspeaker means for receiving said data modified audio signals for amplification and reproduction thereof, interruption detection means comprising amplifier means for amplifying said data modified audio signals, limiter means for limiting the maximum amplitude of said audio signals to produce amplitude limited signals, amplitude detector means for detecting the amplitude of said limited signals and providing detected signals when the amplitude of said limited signals is less than said maximum amplitude, said detected signals having characteristics varying in accordance with said limited signals, and output means receiving said detected signals and providing output signals having characteristics varying with said detected signal.

7. In an information transfer system for transferring audio and data signals simultaneously within a common frequency band, with substantially no interference between the signals, a receiving unit including in combination, means for receiving a data modified audio signal, audio translating means coupled to said signal receiving means for receiving said data modified audio signal for translation thereof, interruption detection means coupled to said signal receiving means for receiving said data modified audio signals for detecting the rate of interruption thereof, said interruption detection means including limiter means for receiving the data modified audio signals and limiting the maximum amplitude thereof to provide limited signals having a first constant amplitude when no interruption is present in said data modified audio signals and having a second lower amplitude when an interruption is present, and a detector circuit coupled to said limiter means and receiving said limited signals, said detector circuit being responsive to the amplitude of said limited signals to provide detected signals having an amplitude varying in accordance with the rate of alternation of said limited signals between said first and second amplitudes.

8. An information transfer system as recited in claim 7 wherein said interruption detection means includes a limiter which receives the data modified audio signals and limits the maximum amplitude thereof to provide limited signals having a first constant amplitude when no interruption is present in said data modified signals and having a second lower amplitude when an interruption is present, and a detector circuit coupled to said limiter and receiving said limited signals to provide detected signals having a predetermined characteristic varying in accordance with the characteristic of said limited signals,.

9. A method of transmitting and receiving data signals simultaneously with an audio signal without causing interference between the signals, said method comprising the steps of, applying the audio signal to a transmission medium, completely interrupting the application of any signal to said transmission medium for periods of fixed duration at a rate varying in accordance with the data being transmitted, the rate of interruption being chosen not to exceed approximately five interruptions per second and the time duration of each interruption being chosen not to exceed approximately 20 milliseconds so that the audio signal is not substantially degraded by said interruptions, receiving the interrupted audio signal from said transmission medium, translating the interrupted audio signal to substantially reproduce the audio signal, detecting a lack of signal indicative of the interruptions of the audio signal, and providing an output signal that varies in response to the rate of said interruptions representative of the transmitted data signal.

10. The method recited in claim 9 wherein the step of detecting said interruptions includes the steps of, amplifying the interrupted audio signal to provide an amplified signal, limiting the maximum amplitude of the amplified signal to provide a limited signal, and detecting decreases in the amplitude of the limited signal.

11. The method recited in claim 10 further including the steps of providing a noise signal, and combining the noise signal with the audio signal prior to the interruption thereof.

* * * * *